United States Patent
Hawkes et al.

4,011,005
Mar. 8, 1977

[54] COUPLER FOR OPTICAL COMMUNICATION SYSTEM

[75] Inventors: Thaddeus Hawkes; Jean-Claude Reymond, both of Paris, France

[73] Assignee: Thomson-CSF, Paris, France

[22] Filed: Jan. 19, 1976

[21] Appl. No.: 650,263

[30] Foreign Application Priority Data

Jan. 22, 1975 France .................. 75.01971

[52] U.S. Cl. ........................ 350/96 C; 350/96 R
[51] Int. Cl.² .......................................... G02B 5/16
[58] Field of Search ............. 350/96 C, 96 B, 96 R

[56] References Cited

UNITED STATES PATENTS

| | | | |
|---|---|---|---|
| 2,881,976 | 4/1959 | Greanias | 350/96 B |
| 3,453,036 | 7/1969 | Swope et al. | 350/96 C |
| 3,455,625 | 7/1969 | Brumley et al. | 350/96 C |
| 3,832,028 | 8/1974 | Kapron | 350/96 C |

*Primary Examiner*—John K. Corbin
*Assistant Examiner*—Stewart Levy
*Attorney, Agent, or Firm*—Cushman, Darby & Cushman

[57] ABSTRACT

A coupler for coupling in the same manner any one of a plurality of optical signal transmission lines to all of the other transmission lines. The coupler comprises at least three elongated frusto-conical shaped arms of transparent material coupled together by their minor bases through a connecting medium and connected by their major bases to end faces of optical transmission lines respectively. The base diameters and the axial length of these arms are determined such that each minor base has a hemispherical radiation pattern given the numerical aperture of the associated transmission line.

11 Claims, 5 Drawing Figures

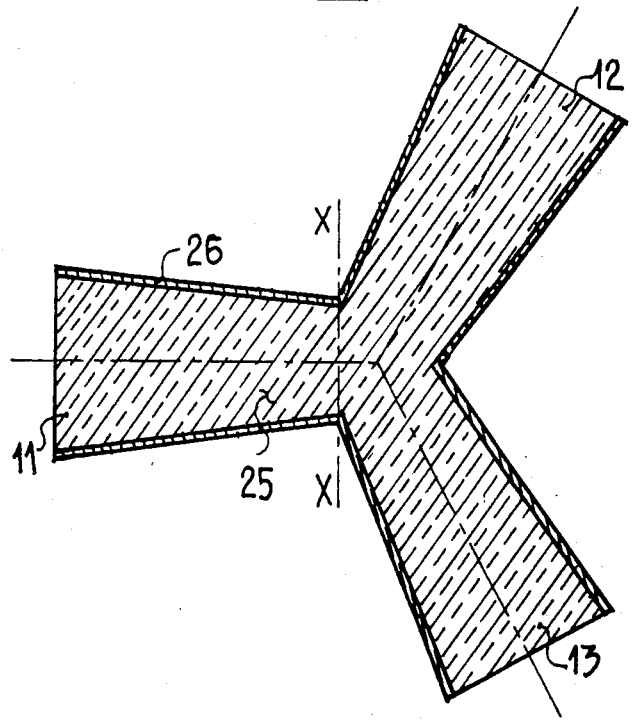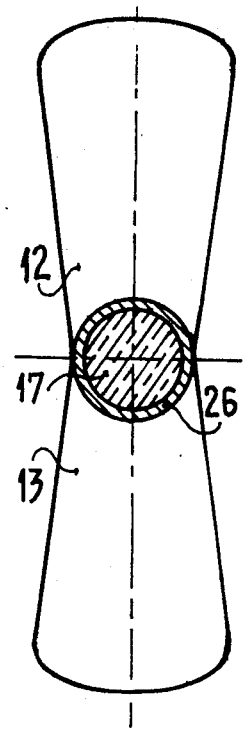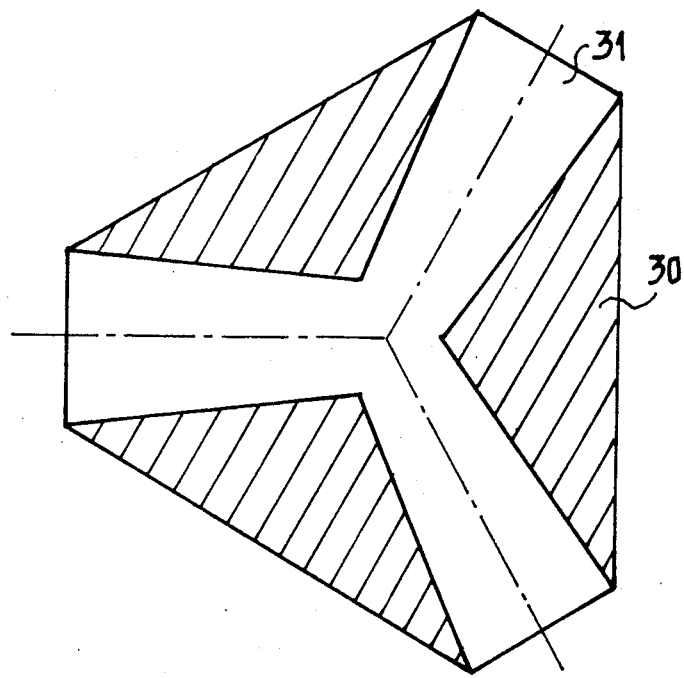

COUPLER FOR OPTICAL COMMUNICATION SYSTEM

The present invention relates to coupler for coupling, in an optical communication system any one of a plurality of optical signal transmission lines to all of the remaining transmission lines.

The transmission media utilized in the transmission of frequencies within the frequency spectrum of light are herein refe.red to as optical signal transmission lines or merely transmission lines which may consist of a single optical waveguide or a bundle thereof. Optical waveguides normally consist of an optical fiber having a transparent core surrounded by a layer of transparent cladding material having a refractive index N2 which is lower than the refractive core index N1.

To establish optical communications between a plurality of points or stations, a variety of interconnection schemes may be utilized.

The optical communication system comprises optical waveguides to connect different points or stations together, these points being provided with light wave transmission devices and/or light receiving devices. In order to connect one transmission point to a plurality of reception points optical couplers are advantageously utilized.

According to common and conventional embodiments, the coupler comprises an input arm which divides into a plurality of output arms. The simplest configuration is a three-armed or Y-structure which has two output arms B and C to divide the light energy which is transmitted by the input arm I. In this direct mode of operation, the input arm I is connected by an optical waveguide to an optical transmitter device and the output arms B and C by optical waveguides to respective light wave receiving devices. The optical coupler is made from a transparent medium whose refractive index is selected as a function of that of the associated guides to provide optical propagation with low losses. The light energy is generally divided equally between the two output arms, the division may be an unequal one if the structure is non-symmetrical or again if it has more than two output arms. In such coupling devices losses are low and consist mainly of absorption and connection losses. On the other hand, these devices are not reciprocal, when their operation is reversed and one of the output arms is connected to a transmitter device, light energy can only be transmitted to arm I, which is assumed to be connected to a receiver device.

Other types of optical coupler permit reciprocal operation. In one known embodiment, the coupler is formed by a cylindrical transparent block termed a mixer, which is connected by one plane face to the various optical transmission lines and whose other plane face is made reflective. The light energy coming from an optical signal transmission line is returned by the reflective face to the surface represented by the junction face. However, a fraction of the light energy is returned in this way to the transmission channel and this is a disadvantage.

One object of the invention is to provide a reciprocal, nonreflective optical coupler which enables any one of a plurality of guides optical transmission lines to be connected to all of the remaining transmission lines in the same manner.

In accordance with a feature of the invention, there is provided an optical coupler for interconnecting transmission lines in an optical communication system having at least three optical signal transmission lines each comprising at least one optical waveguide having a core of transparent material having a refractive index N1 surrounded by a layer of transparent cladding material having a refractive index N2 that is lower than N1, said coupler coupling the signal in any one of said optical transmission lines to all of the remaining optical transmission lines and comprising: a propagation medium of transparent material of refractive index N3, formed by at least three elongated frusto-conical shaped arms, each having an outer side surface and two planar end faces namely a major base and a minor base which are substantially perpendicular to the longitudinal axis thereof and a connecting medium for optical connection of the said minor bases and mechanical holding of said arms, said minor bases having diameters determined such that their respective light radiation pattern in the said connecting medium is substantially hemispherical for the numerical aperture A of the associated transmission line, the value A being equal to $N1^2-N2^2$; layer means surrounding said propagation medium except said major bases for reflecting light that impinges upon the side surface thereof and support means for connecting said transmission lines to said major bases respectively such that the optical waveguides of which a said transmission line is comprised terminate parallel to the corresponding longitudinal arm axis with waveguide end faces disposed in a plane substantially adjacent to the corresponding major base.

The invention will now be further described with reference to the accompanying drawings in which:

FIGS. 3 and 4 are respectively, a cross-sectional elevation and a side-view partially in cross-section, of one embodiment of the optical coupler as in FIG. 2 and, FIG. 5 is a hollow embodiment of the optical coupler of FIG. 2.

An optical coupler according to the invention comprises at least three arms and may be constructed in various forms. To simplify the description, it will be assumed for the moment that the number of arms is restricted to three and that in a preferred embodiment these arms are in the shape of truncated cones.

Figure 1:
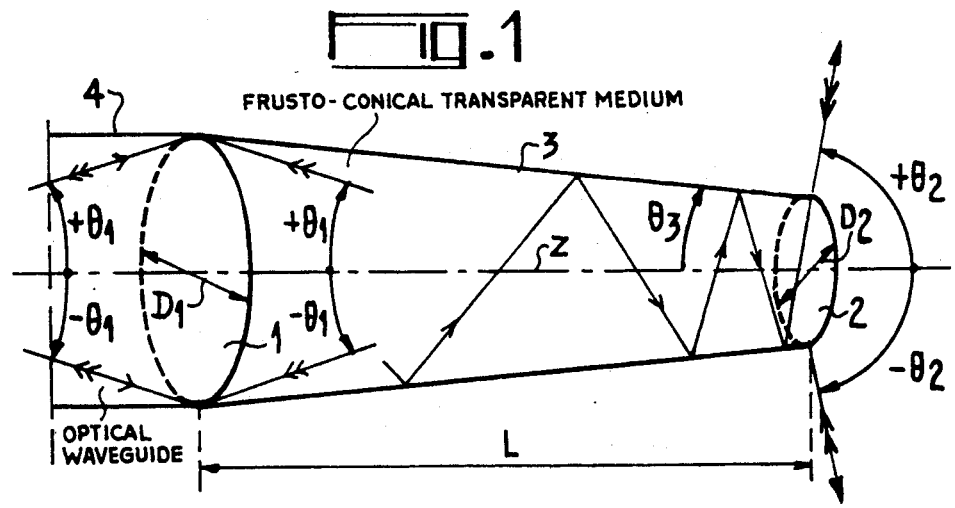
FIG. 1 is a diagram of part of the optical coupling device showing one of its arms.

The principle on which the optical coupler operates is illustrated in FIG. 1, which shows one of its arms. The transparent propagating medium defined by the truncated cone is a body of revolution about an axis Z and is contained between end faces 1 and 2 and the lateral surface 3. The end faces 1, 2 are plane and substantially perpendicular to the longitudinal axis Z and they represent respectively the major base 1 of diameter D1, and the minor base 2 of diameter D2, of the truncated cone, whose height or length is L. The major base 1 is connected to an optical waveguide 4 which is of known numerical aperture. The axis of optical propagation of the guide is the same as that Z of the truncated cone, at least in the terminal connecting part of the optical signal transmission line 4.

Light from an optical source is propagated by guide 4 to that one of its ends which corresponds to end face 1 of the truncated cone. The light rays emerging from the end of the guide are contained within a meridian cone whose apex lies on axis Z, which rests on the outline of face 1, and whose half apex-angle $\theta 1$ is determined by the numerical aperture of the guide. Propagation in an intervening transparent medium between guide 4 and the truncated cone is ignored, the medium possibly being for example a know sealing medium if the guide end is bonded to face 1 or possibly being an air interface if the guide is located and held mechanically by convenient support means opposite face 1 at a very small distance therefrom. It is also assumed that the refractive index of the medium forming the frusto-conical (frustum of a cone) arm is the same or substantially the same as that N1 of guide 4. The deviation angle $\theta 1$ is known as the half acceptance angle and represents the maximum deviation angle of a light ray at any point on entry face 1 and its value is N1 sin $\theta 1 = A$, A being the numerical aperture value.

The Abbe equation applied to the frusto-conical optical element gives the relation:

D1 sin $\theta 1$ = D2 sin $\theta 2$

It signifies that radiation emerging from face 2 is contained within a cone whose half apex-angle is $\theta 2$.

Diameter D2 is made equal to, or close to but slightly greater than, D1 sin $\theta 1$, so that angle $\theta 2$ is equal to $\pi/2$ or slightly less than this value. If it is equal, this gives a value of exactly 1 for sin $\theta 2$.

The converse state of inequality which is not admissible (that is to say when D2 is less than D1 sin $\theta 1$) would mean that part of the light energy is reflected to the guide, which should be avoided.

Consequently, by selecting diameter D2 as indicated, exit face 3 behaves as an emitter having a hemispherical or substantially hemispherical radiation diagram and an aperture angle equal to angle $\theta 2$, that is to say equal to or slightly smaller than $\pi/2$.

If the indices of the optical wave guide 4 and the medium formed by the frusto-conical arm are different, the equation may be written:

D1 sin $\theta 4$ = D2 sin $\theta 2$ with

N1 sin $\theta 1$ = N3 sin $\theta 4$

N1 and N3 being the indices of the guide and the coupler respectively. With an optical fiber guide 4 made up of a transparent core of index N1 and a transparent cladding of index N2, the numerical aperture value A is equal to A = N1 sin $\theta 1$ = $\sqrt{N1^2 - N2^2}$ and in consequence the condition which diameter D2 has to satisfy is that it should be equal to or slightly greater than the value D1 × (A/N3).

It should be pointed out that the length L of the frusto-conical arm plays no part in the aforementioned equation. Nevertheless, it is necessary that its length be made sufficiently great that, in the direction from the guide to the coupler, all the rays propagated by the guide are situated, after total reflection at wall 3, inside the frusto-conical medium, and conversely that in the direction from the coupler to the guide, all the rays emerging from the frusto-conical medium are situated in a meridian cone whose half apex-angle $\theta 1$ corresponds to the numerical aperture. If it is assumed that the indices of the guide and the frusto-conical medium are the same, it may easily be calculated that the half-angle $\theta 3$ of the truncated cone needs to be smaller than the maximum value $\theta 3M = \pi/4 - \theta 1/2$ which means a length L greater than the minimum value Lm, which latter is given by: Lm = (D1 − D2)/2 . tan ($\pi/4 + \theta 1/2$). Where the indices are different, value $\theta 1$ must be replaced by $\theta 4$, the sine of which is equal to A/N3 as stated above, A being the numerical aperture of the guide and N3 the refractive index in the arm of the coupler. By way of example, assuming the indices to be identical and $\theta 1$ to be 15°, the value of diameter D2 is approximately D1/4 and the value of Lm is equal to approximately D1/2. This value Lm is small. In practice, length L will preferably be made large in comparison with diameter D1 and will generally be several times the value of D1 to give frusto-conical members whose half-apex angle $\theta 3$ is small.

It should equally be pointed out that the Abbe equation also applies in the opposite direction, that is to say that for hemispherical incident radiation on face 2 contained in the cone of half-angle $\theta 2$, the radiation emerging from face 1 is contained in a cone whose half-angle $\theta 1$ corresponds to the numerical aperture of guide 4.

Figure 2:
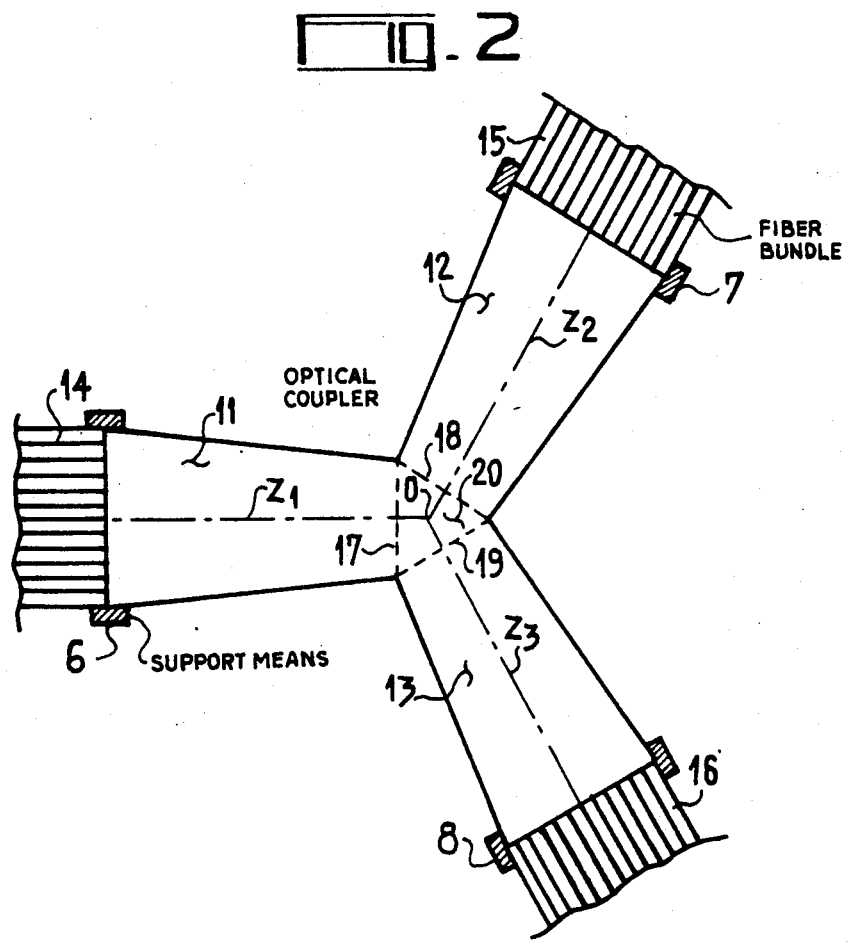
FIG. 2 is a diagram of a three-armed coupler according to the invention.

FIG. 2 shows a preferred embodiment of the optical coupler formed by three frusto-conical arms according to FIG. 1. The major bases of arms 11, 12 and 13 are connected by support means 6, 7, 8 to optical signal transmission lines 14, 15 and 16 respectively, each of which is assumed to be formed by a fiber bundle. Each support means maintain the associated transmission line in alignment with the arms so that the end of the transmission line is disposed within the region defined by the major base area, thereby causing the light emitted by the transmission line to be incident upon the major base. Moreover, each support means maintains the longitudinal axis of each waveguide of the associated transmission line substantially parallel to that of the axis of the arm in question. A light wave propagated by one of the guides, 14 for example, is transmitted by the associated arm 11 to the terminal face 17, which, under the conditions previously described, has a hemispherical radiation diagram. The faces representing the minor bases of elements 12 and 13 are arranged so as to collect the radiation emerging from face 17, and each of these two arms propagates in its turn the fraction of the energy which is receives to its broad end and into the associated light guide. A transparent medium 20 provides an optical connection between the minor bases 17, 18 and 19 of the three arms whilst holding the assembly together mechanically. This medium is formed from the same material as arms 11 to 13. To obtain the same amount of light energy in both arms 12 and 13, the arms are identical and their axes Z2 and Z3 have the same inclination to the axis Z1 of arm 11, and so this amount is at a maximum, that is to say is equal to half the incident energy transmitted by arm 11, faces 18 and 19 need to be symmetrically positioned in relation to axis Z1 and as close as possible to output face 17. Furthermore, reciprocal operation is possible if the configuration remains the same whichever arm is the input arm. In the case of the three-armed uniplanar embodiment shown, this is achieved by arranging the arms at 2 $\pi/3$ from one another, the cross-sections at 17, 18 and 19 forming an equilateral triangle in the plane of the Figure and corresponding to the three faces of a regular prism. In fact, the configuration is symmetrical about the point 0 at which the three axes Z1, Z2 and Z3 meet and it is this general condition which has to be satisfied in the case of configurations having larger numbers of arms in order to achieve reciprocal operation. Thus, a four-armed reciprocal coupler calls for a geometrical configuration in which the axes meet at a common point and are perpendicular to respective ones of the four faces of a regular tetrahedron formed by the planes of the minor bases. There is thus a limit to the number of different reciprocal couplers which can be produced, the number corresponding to the possible different regular polyhedrons, a 12-armed coupler for example will have its axes perpendicular to the faces of a regular dodecahedron.

It is understood that a reciprocal embodiment of coupler is preferred but, if conditions of reciprocity or symmetry, or both, are not essential in the type of operation concerned, the number, size and respective positions of the arms may be as desired and the coupler may thus take a large number of different forms.

The transparent medium formed by the arms and the connecting medium may be glass or a plastics material whose refractive index corresponds to the refractive index of propagation in the connecting guides. For optical fiber, the index N3 of the coupler will correspond to that N1 of the core of the fiber. To achieve total reflection at the side walls of the arms and the connecting medium as well as isolation from the external surroundings, these walls may be coated with, for example, a layer of a reflecting material, such as a deposit of metal, or with a material whose refractive index is lower than that N3 of the coupler. An embodiment corresponding to the three-armed reciprocal coupler of FIG. 1 is shown in cross-section in FIG. 3, and as a side-view in FIG. 4 with a cross-section along X—X in the region where face 17 is situated. The transparent block 25 is covered with a deposit of metal 26 or with a transparent material whose refractive index is lower than that of block 15. In this latter case, the coating material may itself be coated on the outside with a deposit of metal so that any rays which may be refracted in the medium of lower refractive index are reflected by the metal layer and may be recovered. The coating used covers the whole of the coupler except the faces where it is connected to the guides.

The coupler may be produced without difficulty by machining on the one hand the truncated cones which form the various arms and on the other the connecting medium 20, which latter may be a slice of an equilateral prism where there are three arms, or of a regular polyhedron where there are four or more arms. The truncated cones are then bonded in position by known techniques using a transparent sealing material whose refractive index is the same as the material forming the arms and the connecting medium. The lateral surfaces may then be recovered with a deposit of metal or by other means.

The coupler may also be produced as a hollow body as shown in FIG. 5, which represents the case of a three-armed coupler. It can be produced in this way from a blcok 30 which is cut away at 31 to form the propagating medium, this latter being formed by air. Block 30 may be a block of metal whose internal cavity walls are carefully polished, or it may be formed from another material whose internal walls are metallised.

Preferably, the truncated cones forming the arms of the coupler are of circular cross-section so that they are easier to produce and to connect to the guides. It should however be remembered that the circular shape is not mandatory and that operation is also possible with an elliptical or polygonal cross-section for example. The Abbe equation, or better the Clausius equation which makes use of an expression for area rather than a linear dimension to express restriction on the spread of a light beam, applies in a similar way and gives the same conditions of geometric similarity which have to be satisfied between the cross-sections of faces 1 and 2 of each arm.

When applied to an optical communication system, a coupler of the reciprocal type described having n arms enables any of n points or subscribers to be connected together under conditions of transmission and reception which are the same for each point, one of the points being the transmitter and the others being receivers at any given time of operation.

Of course, the invention is not limited to the embodiments described and shown which were given solely as examples.

What is claimed is:

1. An optical coupler for interconnecting transmission lines in an optical communication system having at least three optical signal transmission lines each comprising at least one optical waveguide having a core of transparent material having a refractive index N1 surrounded by a layer of transparent cladding material having a refractive index N2 that is lower than N1, said coupler coupling the signal in any one of said optical transmission lines to all of the remaining optical signal transmission lines and comprising:
    a propagation medium of transparent material of refractive index N3, formed by at least three elongated frusto-conical shaped arms, each having an outer side surface and two planar end faces namely a major base and a minor base which are substantially perpendicular to the longitudinal axis thereof and a connecting medium for mutual optical interconnection of the said minor bases and for mechanical holding of said arms, said longitudinal axes meeting at a common point situated in the said connecting medium which is comprised between said minor bases, said arms being symmetrically disposed with respect to the said common point so that the angle between any pair of said axes is the same, said minor bases having diameters determined such that their respective light radiation pattern in the said connecting medium is substantially hemispherical for the numerical aperture A of the associated transmission line, the value A being equal to $\sqrt{N_1^2 - N_2^2}$,
    layer means surrounding said propagation medium except said major bases for reflecting light that impinges upon the side surfaces thereof, and
    support means for connecting said transmission lines to said major bases respectively such that the optical waveguide of which a said transmission line is comprised terminate parallel to the corresponding longitudinal arm axis with waveguide end faces disposed in a plane substantially adjacent to the corresponding major base.

2. A coupler according to claim 1, wherein said arms are identical for coupling said signal in any one of said optical transmission lines to all of the remaining optical transmission lines in the same manner.

3. A coupler according to claim 2, wherein the cross-section of the arms is circular and in that the diameter D2 of a minor base is determined substantially equal to its maximum value D1(A/N3), where D1 is the diameter of the corresponding major base.

4. A coupler according to claim 3, wherein the length between the minor and major bases is determined greater than $(D1 - D2)/2 \cdot \tan(\pi/4 + \theta 4/2)$ where $\theta 4$ is given by $\sin \theta 4 = A/N3$.

5. A coupler according to claim 4, wherin the number of arms is equal to $n$, $n$ being greater than three, the minor bases lying respectively in the planes of the faces of a regular n-faced polyhedron which delimits said connecting medium.

6. A coupler according to claim 4, wherein the said layer means is formed from a deposit of metal.

7. A coupler according to claim 4, wherein the refractive index N1 of said optical waveguide cores and the refractive index N3 of said propagation medium are substantially equal.

8. A coupler according to claim 4, wherein the said layer means is formed from a transparent material of predetermined refractive index lower than the said refractive index N3.

9. A coupler according to claim 8, wherein the said layer means is further metallised on the outside.

10. A coupler according to claim 4, wherein it has three arms according to a Y configuration with the minor bases respectively in the planes of the faces of a three-faced regular prism.

11. A coupler according to claim 10, wherein it is formed as a hollow body from a block of a material which contains recesses representing the said arms and connecting medium and in that the walls of the said recesses are of polished metal.

* * * * *

UNITED STATES PATENT OFFICE
CERTIFICATE OF CORRECTION

Patent No. 4,011,005  Dated March 8, 1977

Inventor(s) Hawkes et al

It is certified that error appears in the above-identified patent and that said Letters Patent are hereby corrected as shown below:

Column 2, line 24, read the formula as follows:

$$-- \sqrt{N1^2 - N2^2} --$$

Column 3, line 51, read the formula as follows:

$$-- A - N1 \sin \Theta1 = \sqrt{N1^2 - N2^2} --$$

Column 6, line 49 (claim 1, line 30), read the formula as follows:

$$-- \sqrt{N_1^2 - N_2^2} --$$

Signed and Sealed this

Twenty-eighth Day of June 1977

[SEAL]

Attest:

RUTH C. MASON  
Attesting Officer

C. MARSHALL DANN  
Commissioner of Patents and Trademarks